United States Patent [19]

Sauber

[11] 4,456,326

[45] Jun. 26, 1984

[54] WALL MOUNTABLE CABLE TERMINAL BLOCK

[76] Inventor: Charles J. Sauber, 10 N. Sauber Rd., Virgil, Ill. 60182

[21] Appl. No.: 473,073

[22] Filed: Mar. 7, 1983

Related U.S. Application Data

[63] Continuation-in-part of Ser. No. 405,060, Aug. 4, 1982, abandoned.

[51] Int. Cl.³ .......................... H01R 4/36; H02B 1/02
[52] U.S. Cl. ............................. 339/272 A; 339/125 R
[58] Field of Search ........... 339/272 R, 272 A, 125 R, 339/132 B, 14 L, 198 R, 198 N; 403/405, 408; 179/166 S, 169

[56] References Cited

U.S. PATENT DOCUMENTS 2,511,995  6/1950  Robertson et al. ............. 339/198 N
4,203,645  5/1980  Shennett ..................... 339/272 A X Primary Examiner—Eugene F. Desmond
Attorney, Agent, or Firm—Leydig, Voit, Osann, Mayer & Holt, Ltd.

[57] ABSTRACT

A wall mountable electrical cable terminal block for grounding or lightning arresting which includes a mounting plate having openings at diagonally opposite corners for receiving mounting fasteners, a pair of openings having threaded means on the plate at the other diagonally opposite corners to receive a pair of nylon hexagon-shaped posts having longitudinally extending threaded means at their opposite ends that are threadably attachable to the plate threaded means, a conductive unitary block member having openings for receiving bolts to secure the block to the posts and the block having a plurality of inwardly extending side openings that receive insulation stripped ends of cable with the face of the block having threaded ports communicating with each of the cable receiving openings so that set screws within the ports hold the cable ends to the block.

4 Claims, 3 Drawing Figures

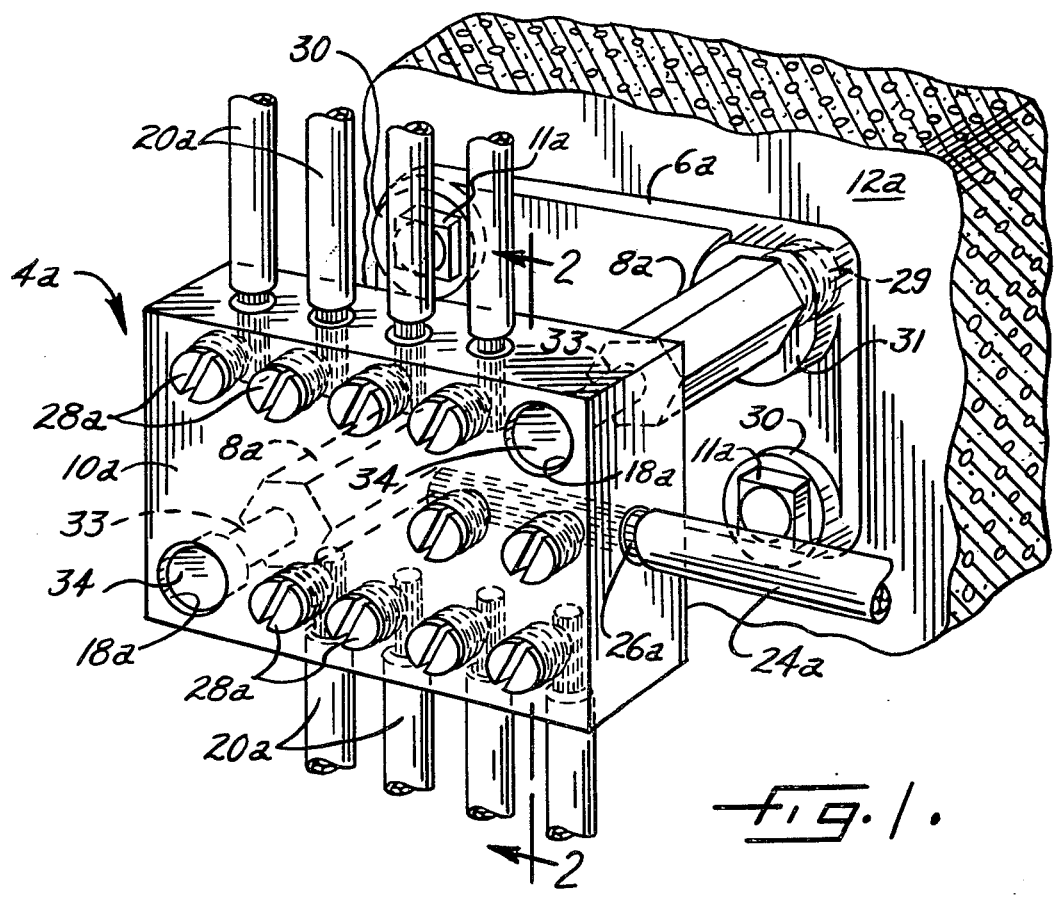
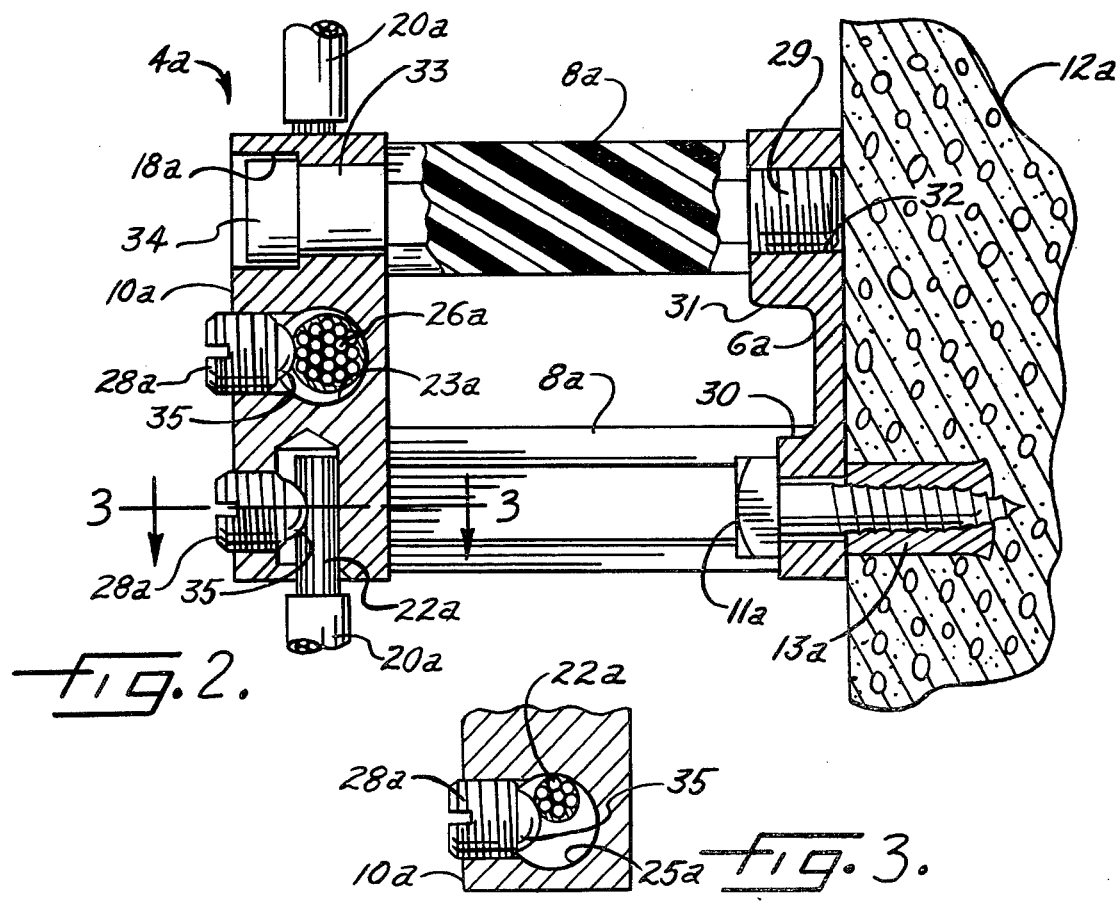

WALL MOUNTABLE CABLE TERMINAL BLOCK

CROSS REFERENCE TO RELATED APPLICATION

This application is a continuation-in-part of U.S. application Ser. No. 405,060, filed Aug. 4, 1982, now abandoned.

FIELD OF THE INVENTION

The present invention relates generally to electrical grounding terminal blocks and more particularly to an improved wall mountable grounding terminal device which is relatively convenient and simple to install such as, for example, with telephone cables for grounding and lightning arresting in buildings.

BACKGROUND OF THE INVENTION

In order to provide for grounding and lightning arresting of electrical lines such as telephone lines in buildings, it has been a common practice to provide a wall mountable terminal plate for receiving multiple lines that are connected to a ground cable. One such type widely used comprises a plate of conductive material such as copper to which a number of connectors are attachable and the plate itself is bolted to a pair of spaced insulators carrying flanged brackets that mount to a wall or other structural surface using four lag bolts. Commonly, as many as eight lines would be connector attached to the plate for grounding through a grounding cable. That arrangement not only required use of large numbers of connectors, but it also required more time and effort for both installation and removal, such as when relocating the grounding plate.

OBJECTS OF THE INVENTION

Accordingly, it is an object of the present invention to provide an improved compact grounding block device which is relatively simple to install and saves time and handling when installing or removing and yet also reduces the cost of components.

Another object of the present invention is to provide a grounding block device which is more compact and easier to transport, handle and use than previous grounding terminal plate devices.

BRIEF DESCRIPTION OF THE DRAWINGS

Other objects and advantages of the present invention will be apparent from the foregoing description and upon reference to the accompanying drawing in which:

FIG. 1 is a perspective view of an illustrative embodiment of a grounding terminal block as mounted to a wall in accordance with the present invention;

FIG. 2 is a sectional view taken substantially along the line 2—2 in FIG. 1;

FIG. 3 is a partial section taken along the line 3—3 in FIG. 2.

While the invention will be described in connection with certain preferred embodiments, it will be understood that it is not intended to limit the invention to those particular embodiments. On the contrary, it is intended to cover all alternatives, modifications and equivalents as may be included within the spirit and scope of the invention as defined by the appended claims.

DETAILED DESCRIPTION

Turning now to the drawing, FIG. 1 illustrates a wall mountable grounding terminal construction in accordance with the present invention, generally indicated at 4a, which includes a wall mounting plate 6a, insulated support rod members 8a and a unitary conductive wire clamping block 10a, preferably made from solid copper.

The wall mounting plate 6a, which can be a unitary cast member, is provided with a first set of bosses 30 in diagonally opposite corners having openings to receive the pair of lag bolts 11a or the like that can be screwed into the wall plug 13a. Thus the wall mounting plate may be easily located and mounted to a wall or other structure in a building. The plate 6a is also provided with a second pair of bosses 31 in diagonally opposite corners having openings 32 therein which are threaded.

The insulated support rod members 8a are provided with outwardly projecting threaded ends 29 which can be received by and threaded into the plate openings 32. The other end 33 of the rods 8a have button-like caps 34 formed or fixable to the rod ends so as to be located in counter-sunk openings 18a provided at the respective diagonally opposite corners of the block 10a. The arrangement is such that the rods 8a are permanently preattached to the block 10a while still remaining freely rotatable about the shaft 33 with respect to the block. Accordingly, the rods may be easily threaded into the threaded openings 32 of the wall mounted plate 6a thereby providing the support post and terminal block attachment which may be readily accomplished by hand rotation of the rods or with an open wrench.

In order to provide for attachment of electrical wires such as insulated line wires 20a with stripped ends and insulated ground wire 24a having a stripped end 26a to the block 10, the top and bottom sides of the block have vertically inwardly extending drilled openings corresponding in number to the wires to be received and at a side of the block there is a horizontally inwardly extending opening 23a. At the face of the block 10a threaded ports extend inwardly to communicate with each wire receiving opening and receive set screws 28a that enable fixedly holding the stripped ends of the wires to the block 10a. The set screws 28a are provided with a more ball-like or rounded end 35 to facilitate gripping and holding of a wide variety of wire diameters as illustrated in FIGS. 2 and 3.

While in the illustrative arrangement as here shown, provision has been made for four sets of wires 20a to be connected to the terminal block 10a with one wire 24a for the main ground, it will be appreciated that a more elongated wire clamping block can be utilized with the same arrangement permitting even more sets of wires to be connected to the block.

I claim as my invention:

1. A wall mountable electric cable terminal comprising, in combination, a mounting plate having first means defining openings for receiving mounting fasteners, a pair of openings having threaded means associated with said plate, a pair of insulated rod means with first and second ends, said first ends having longitudinally extending threaded end means for securement to said plate threaded means and said second ends having cap means, a conductive block member having counter-sunk openings for receiving said cap means on said second ends of said insulated rod means to secure the block to the rod means, said cap means being fixed to said rod means to provide insulated rod means permanently attached to said block but freely rotatable with respect to said block and said block with rod means being adapted to be affixed to the mounting plate threaded means by rotation of the rod means, said block having a plurality of inwardly extending side openings for receiving insulation stripped ends of cable and the face of said block including threaded ports communicating with each of said cable receiving openings and carrying set screw means for holding the cable ends to the block.

2. A wall mountable cable terminal as claimed in claim 1 wherein said insulated rod means comprises hexagon-shaped nylon material.

3. A wall mountable cable terminal as claimed in claim 1 wherein said plate mounting openings are at diagonally opposite corners and the threaded means, insulated rod means and conductive block fastening means are at the remaining diagonally opposite corners.

4. A wall mountable cable terminal as claimed in claim 1 wherein said pair of plate openings include threads formed therein, and said insulated rod means includes external threaded ends that threadably attach to said threaded plate openings.

* * * * *